US011927556B2

(12) United States Patent
Obando Gamboa et al.

(10) Patent No.: US 11,927,556 B2
(45) Date of Patent: Mar. 12, 2024

(54) THERMAL CONDUCTIVITY OF VISCOELASTIC MATERIALS

(71) Applicants: Carlos Javier Obando Gamboa, Tempe, AZ (US); Kamil Elias Kaloush, Scottsdale, AZ (US)

(72) Inventors: Carlos Javier Obando Gamboa, Tempe, AZ (US); Kamil Elias Kaloush, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 101 days.

(21) Appl. No.: 17/667,038

(22) Filed: Feb. 8, 2022

(65) Prior Publication Data

US 2022/0252532 A1 Aug. 11, 2022

Related U.S. Application Data

(60) Provisional application No. 63/146,987, filed on Feb. 8, 2021.

(51) Int. Cl.
*G01N 25/18* (2006.01)
(52) U.S. Cl.
CPC ................... *G01N 25/18* (2013.01)
(58) Field of Classification Search
CPC ...................................................... G01N 25/18
See application file for complete search history.

(56) References Cited

U.S. PATENT DOCUMENTS

| 3,242,716 A * | 3/1966 | Webb ..................... G01N 25/18 374/44 |
| 6,824,306 B1 * | 11/2004 | Fesmire ................. G01N 25/18 374/34 |

FOREIGN PATENT DOCUMENTS

| CA | 2125537 C * | 1/2000 | ............. G01N 25/18 |
| CN | 202814902 | 3/2013 | |
| CN | 103884736 | 6/2014 | |
| CN | 106770447 | 5/2017 | |

OTHER PUBLICATIONS

C. J. Obando and K. E. Kaloush, "Estimating the Thermal Conductivity of Asphalt Binders," Journal of Testing and Evaluation 50, No. 2 (Mar./Apr. 2022): 1107-1119. https://doi.org/10.1520/JTE20210208 (Year: 2022).*

(Continued)

*Primary Examiner* — Mirellys Jagan
(74) *Attorney, Agent, or Firm* — Fish & Richardson P.C.

(57) ABSTRACT

Assessing a thermal conductivity of a viscoelastic material in a steady state using a conduction method includes i) allowing a sample of the viscoelastic material to reach thermal equilibrium in a liquid at a first temperature, ii) assessing a heat flow of the sample at the first temperature, iii) repeating i) and ii) at one or more additional temperatures, and iv) assessing the thermal conductivity of the viscoelastic material based on the heat flow of the sample at the first temperature and the one or more additional temperatures, a cross-sectional area of the sample, and a temperature-thickness gradient of the sample at thermal equilibrium.

10 Claims, 5 Drawing Sheets

(56) References Cited

OTHER PUBLICATIONS

Carlson et al., "Determining Thermal Conductivity of Paving Materials Using Cylindrical Sample Geometry," ASCE Journal of Materials in Civil Engineering, 2010, 22(2): 186-195.
CoolCosmos.ipac.CalTech.edu [online], "How does heat travel?" available on or before Nov. 26, 2019, via Internet Archive: Wayback Machine URL <http://web.archive.org/web/20191126061401/http://coolcosmos.ipac.caltech.edu/cosmic_classroom/light_lessons/thermal/transfer.html>, retrieved Jan. 23, 2023, URL <http://coolcosmos.ipac.caltech.edu/cosmic_classroom/light_lessons/thermal/transfer.html>, 3 pages.
Côté et al., "Thermal conductivity of bitumen concrete," Can. J. Civ. Eng., 2013, 40:172-180.
DeDene et al., "Thermal conductivity of reclaimed asphalt pavement (RAP) and its constituents," International Journal of Pavement Engineering, 2016, 17(5):435-439.
EngineeringToolBox.com [online], "Plastics—Thermal Conductivity Coefficients," available on or before Nov. 29, 2019, via Internet Archive: Wayback Machine URL <http://web.archive.org/web/20200808122742/https://www.engineeringtoolbox.com/thermal-conductivity-plastics-d_1786.html>, retrieved Jan. 23, 2023, URL <https://www.engineeringtoolbox.com/thermal-conductivity-plastics-d_1786.html>, 8 pages.
EngineeringToolBox.com [online], "Thermal Conductivity of selected Materials and Gases," available on or before Nov. 28, 2019, via Internet Archive: Wayback Machine URL <http://web.archive.org/web/20191128151929/https://www.engineeringtoolbox.com/thermal-conductivity-d_429.html>, retrieved Jan. 23, 2023, URL <https://www.engineeringtoolbox.com/thermal-conductivity-d_429.html>, 17 pages.
Goodfellow.com [online], Polymethylmethacrylate—online catalogue source—supplier of research materials in small quantities. available on or before Dec. 4, 2019, via Internet Archive: Wayback Machine URL <http://web.archive.org/web/20191204151803/http://www.goodfellow.com/E/Acrylonitrile-Methylacrylate-copolymer.html>, retrieved Jan. 23, 2023, URL <http://www.goodfellow.com/E/Acrylonitrile-Methylacrylate-copolymer.html>, 4 pages.
Yüksel et al., "The effective thermal conductivity of insulation materials reinforced with aluminium foil at low temperatures," Heat and Mass Transfer, 2012, 48:1569-1574.
Yüksel, "The investigation of structure and operating parameters effect on the heat transfer coefficient in porous structures," Doctoral Thesis, Uludag University, Department of Mechanical Engineering, 2010, 257 pages [with English Abstract].
Yüksel, "The Review of Some Commonly Used Methods and Techniques to Measure the Thermal Conductivity of Insulation Materials," Insulation Materials in Context of Sustainability, Aug. 2016, Chapter 6, 28 pages.

* cited by examiner

THERMAL CONDUCTIVITY OF VISCOELASTIC MATERIALS

CROSS-REFERENCE TO RELATED APPLICATION

This application claims the benefit of U.S. Patent Application No. 63/146,987 filed on Feb. 8, 2021, which is incorporated herein by reference in its entirety.

TECHNICAL FIELD

This invention relates to assessing thermal conductivity of viscoelastic materials.

BACKGROUND

There is much interest in environmental issues related to pavement, including how to save energy and mitigate the urban heat island (UHI) effect. Addressing the environmental and UHI performance aspects of pavement includes determination of pavement thermal conductivity. Asphalt concrete represents the third most widely used resource in the world, with asphalt-paved roads being its principal usage. One component of asphalt concrete is bitumen. Bitumen is a viscoelastic material susceptible to temperature changes.

SUMMARY

This disclosure describes methods for assessing thermal conductivity of viscoelastic materials, such as asphalt binders. The determination of thermal conductivity of the asphalt binders is a factor in the understanding and improvement of its thermal performance. There are few test methods and equipment to measure thermal conductivity of asphalt binders. Some of those are expensive and require special equipment and instrumentation. This disclosure provides a simplified alternative testing technique to measure thermal conductivity of viscoelastic materials, such as asphalt binders. The determination of the thermal conductivity of bitumen samples using the method described was validated on material of known thermal conductivity. In addition, eighteen samples of different binder grades were tested using the developed method. The average test results were repeatable and within known thermal conductivity values; the coefficient of variation between the various samples were in the 7 to 8% range. This method to estimate thermal conductivity of bitumen samples was found to provide an affordable alternative test procedure with good accuracy.

In a first general aspect, assessing a thermal conductivity of a viscoelastic material in a steady state using a conduction method includes i) allowing a sample of the viscoelastic material to reach thermal equilibrium in a liquid at a first temperature, ii) assessing a heat flow of the sample at the first temperature, iii) repeating i) and ii) at one or more additional temperatures, and iv) assessing the thermal conductivity of the viscoelastic material based on the heat flow of the sample at the first temperature and the one or more additional temperatures, a cross-sectional area of the sample, and a temperature-thickness gradient of the sample at thermal equilibrium.

Implementations of the first general aspect may include one or more of the following features.

In some implementations, the temperature-thickness gradient of the sample is equal to a difference between an equilibrium temperature at an interior of the sample and an equilibrium temperature at an exterior surface of the sample divided by a distance from the exterior surface of the sample to the interior of the sample. The sample can be a cylinder. The cylinder can define an opening along a longitudinal axis of the cylinder. The surface of the opening can define the interior of the sample. The equilibrium temperature at the interior of the sample may correspond to a temperature at the surface of the opening.

In certain implementations the viscoelastic material includes bitumen. In some implementations the liquid includes water. Certain implementations include molding the viscoelastic material to yield the sample. The first temperature and the one or more additional temperatures can span a range between about 30° C. and about 80° C.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1B:
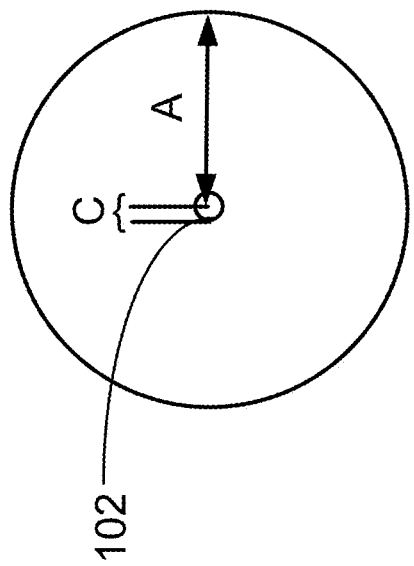
FIGS. 1A-1C depicts an acrylic sample for thermal conductivity assessment.

This disclosure describes methods to assess thermal conductivity of viscoelastic materials, such as bitumen.

In conduction, heat is transmitted through a material medium, and there is no transport of matter. The rate at which heat is transferred through the material (dQ/dt) is represented by the letter Q and is called the heat flow rate. Empirically, the heat flow rate is proportional to the cross-sectional area (A) to the direction of the flow and the temperature difference on both sides of the material (ΔT), and inversely proportional to the distance traveled from the place at the highest temperature (Δx). That is:

$$Q \approx A \frac{\Delta T}{\Delta x} \qquad (1)$$

To achieve the equality of the Equation 1, a constant k (the thermal conductivity) is introduced. Thermal conductivity is a measure of the effectiveness of a material as a thermal insulator:

$$Q = \frac{dQ}{dt} = kA \frac{\Delta T}{\Delta x} \qquad (2)$$

The conduction into a cylindrical geometry is described by Equation 3

$$Q = 2\pi h k \frac{\Delta T}{\ln \frac{r2}{r1}} \quad (3)$$

where:
- Q: heat flow rate (W=joule/s)
- A: the cross-sectional area (m²)
- ΔT: the temperature gradient (° C.)
- Δx: the thickness (m)
- k: the thermal conductivity (W/m° C.)
- h: length/height of the sample (m)
- r1: inner radius (m)
- r2: outer radius (m)
- t: time (s)

Thermal conductivity is inherent to each material and expresses the ability of a given material to conduct heat. Thermal conductivity can be affected by moisture, ambient temperature, and the density of the material. If moisture, temperature, and density are increased, the thermal conductivity rises too, so thermal conductivity is not constant.

Although there are many methods to estimate thermal conductivity, there are few for viscoelastic materials such as bitumen, or asphalt binder. A first category includes steady-state methods, and a second category includes transient or of non-steady-state methods. All methods are based on electrical analogy and on the essential laws of heat conduction. However, the implementation of each method depends on the characteristic of the materials. Steady-state methods rely on measurements taken at equilibrium states, and non-steady-state or transient methods rely on measurements taken during a heating progression.

Asphalt concrete represents the third most widely used material in the world, with asphalt-paved roads being its principal usage. One of the most important components of asphalt concrete is bitumen, a residue of oil distillation processes. Bitumen is a viscoelastic material susceptible to temperature changes: it can be as brittle as glass at low temperature and flow like oil at high temperatures. Thus, determination of thermal conductivity of the bitumen can provide some insight into its thermal performance.

The determination of the thermal conductivity of bitumen samples using the method described in this document was first used on material of known characteristics and thermal conductivity. The calibration sample used was acrylic glass (Plexiglas V045i), which has a known thermal conductivity range between 0.17 W/m-° C. and 0.20 W/m-° C.

Thermal conductivity is related to the heat transfer rate, which is central in the estimation of thermal conductivity. Based on characteristics of the bitumen/asphaltic binder, the medium to transfer the heat was chosen as distilled water in no macroscopic movement. Then, the temperature transfer from the outside to the sample is realized using nonturbulent, distilled water. At the liquid-solid interface, mechanisms contributing to heat transfer are convection and conduction. However, the present work restricts the domain study to the sole solid sample. This assumption is sustained by the fact that the bitumen is considered as a solid. Therefore, it is possible to restrict the heat transfer rate (Q) calculation to a conduction-driven mechanism only, using Equation 3.

The heat flow rate is independent of radial location but varies depending on the temperature of the water; therefore, it was necessary to calibrate the model measuring Q at several temperature points. This calibration method compares different water temperatures and the resulting heat flow rate, knowing the thermal conductivity, and the geometrical features of the acrylic sample.

To determine the heat flow rate, the two final steady temperatures in the system are measured. In this approach, the outer temperature is the water temperature being controlled by the water bath, and the inner temperature is the one in the center of the acrylic sample. To avoid the interference of air currents that could alter the temperature readings and make it more difficult reaching the steady state temperatures, the experimental setup was employed inside a chamber conditioned at 25° C. To control the water temperature, a water bath (Thermo Scientific, 180 Series, Model: Precision) was used. For temperature measurements, J type thermal couples (−40 to 510° C.) were used, and a software LabVIEW 8.6 with a DAQ system were used to record the temperature changes along with time. To check the accuracy of the temperature readings, a high precision thermometer (Precision RTD Handheld Data Logger Thermometer) was used.

Figure 1C:
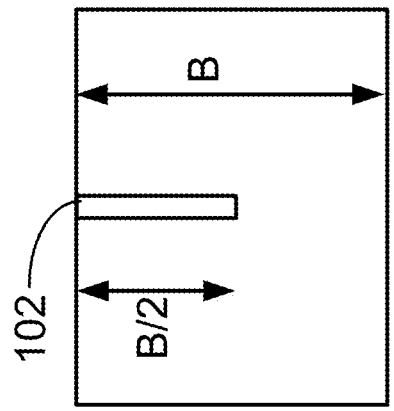
Figure 1A:
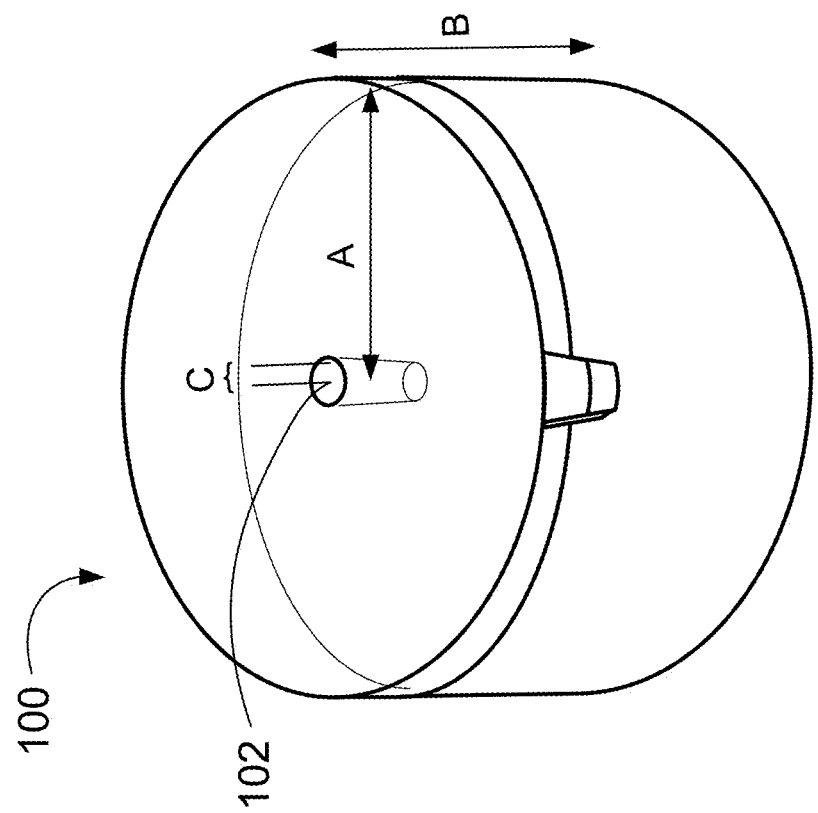

An example of an acrylic sample 100 used for calibration of the model is shown in FIG. 1A. The sample has radius A and height B. Opening 102 has radius C and extends into the sample (e.g., half of the height B into the interior of the sample). FIGS. 1B and 1C are top and side cross-sectional views, respectively, of acrylic sample 100, showing opening 102. For samples described herein, A is 20 mm, B is 25 mm, and C is 1 mm. However, other sizes and shapes can also be used.

To measure the thermal conductivity in steady state using a conduction method, the heat flow is understood to travel in one direction. To measure the thermal conductivity in steady state using a conduction method, it is optimal to ensure that the heat flow goes only in one direction. A balsa wooden platform was used to place the samples inside the water bath. This setup is avoids the water outer temperature affecting the inner temperature in the center of the acrylic cylinder. An isolator foam was used on the top of the acrylic sample, and a high vacuum grease silicone was used on the bottom. This grease has sealing ability and at the same time excellent resistance to water. Additionally, because of the relatively high specific heat capacity, 2,900 J/kgK16, a very low thermal conductivity, 0.045 W/m° K17, of the balsa wood, the very low power in the system (e.g., 0.09 W at 47° C.), and the short time of the test (2 h), it is considered that no significant heat enters from the bottom of the sample. The samples were submerged into the water bath taking care that the level of water goes near the edge of the top circular face. For temperatures above 50° C., it is recommended to cover partially the water bath to avoid water evaporation.

After a length of time, the temperatures reach a steady state. Note that the time needed to get to the steady state may vary; however, for this setup the usual time was about 1.5 hours. Once the steady-state temperatures are reached, the readings can be recorded for an additional length of time (e.g., at least 30 minutes), the average steady-state temperature values can be calculated.

From Equation 3, it is possible to calculate the heat flow rate for each temperature. In this example, Q was assessed for water temperatures between 29.5° C. and 82° C.

Figure 2:
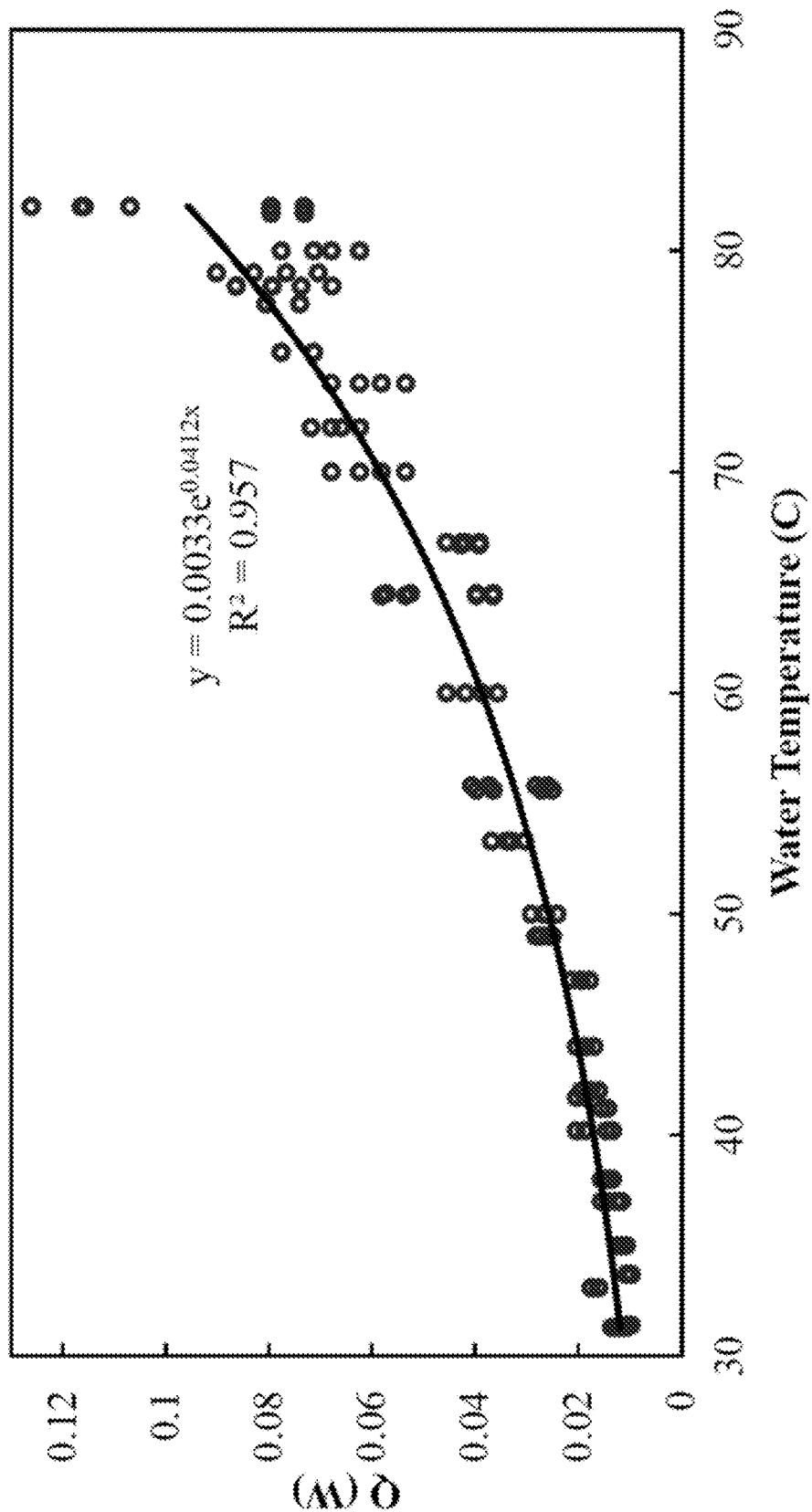
FIG. 2 shows heat flow as a function of temperature for the acrylic sample of FIGS. 1A-1C.

The acrylic used to estimate the heat flow of the system has a thermal conductivity of 0.185W/m-° C. FIG. 2 shows heat flow Q at various temperatures for the acrylic sample. Equation 4, below, is used to find Q in the calibration process.

$$Q(W) = 0.0033 e^{0.0412 T1} \quad (4)$$

where:
Q: heat flow rate (W=joule/s)
T1: the outer temperature (water temperature) (° C.)

Figure 3:
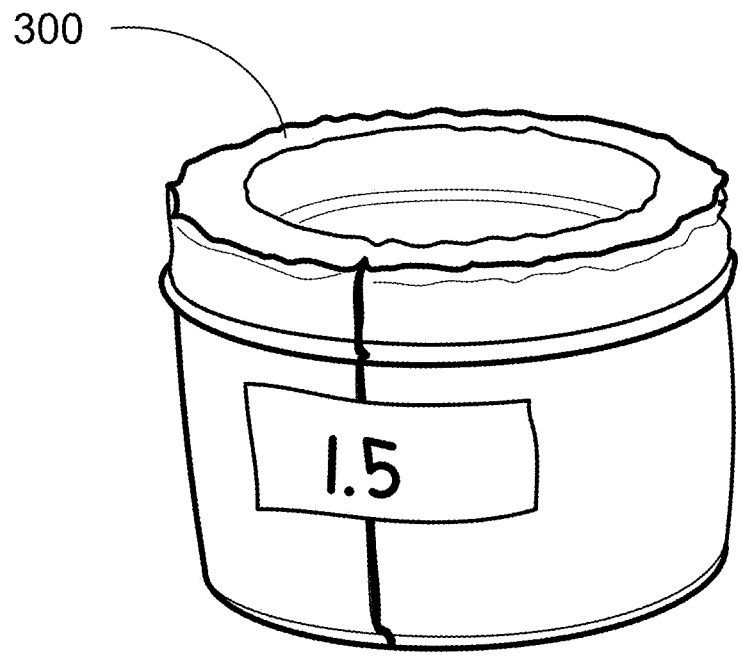
FIG. 3 depicts a mold for forming a cylinder of a viscoelastic material.

To follow the above test procedure, asphalt-binder samples with dimensions similar to those of the acrylic cylinders were prepared. Molds were made to receive the hot asphalt binder. FIG. 3 depicts mold 300 formed of silicone. The material used to create the mold was a commercial product that consists of two liquid substances. These substances were mixed in a specific proportion to yield a raw silicone material. This silicone material can support temperatures above 300° C.

Figure 4:
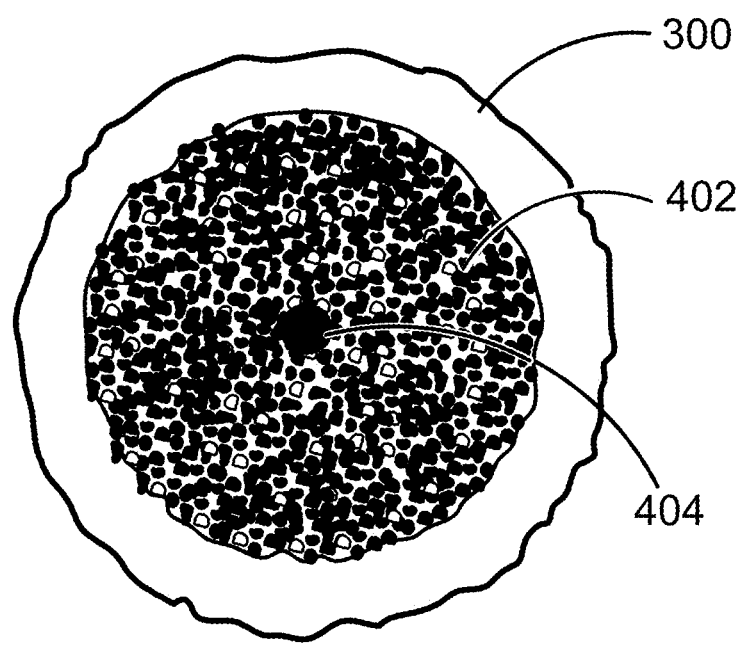
FIG. 4 depicts a mold containing a viscoelastic sample.

FIG. 4 depicts mold 300 with asphalt-binder sample 402 inside the mold. Once the hot binder is poured in the mold and cooled down, opening 404 having a 1 mm radius is drilled in the center of the top circular face, reaching to an interior of the sample, similar to the acrylic sample 100. Opening 404 is made using a heated metallic rod of 2 mm in diameter (or a 2 mm screwdriver). The asphalt-binder sample 402 can be cooled (e.g., in a freezer for 20 minutes at −10° C.) before drilling or removing from the mold 300.

Once the samples are ready, the thermocouple is placed in the center hole, and the samples are placed on a wooden platform. High vacuum silicone grease is applied to the bottom of the circular face of each sample. The grease helps secure the samples to the wooden platform but avoids adhesion.

time. Care in selecting, manipulating, and calibrating the thermocouples and water-bath provided repeatable and accurate results.

Figure 5:
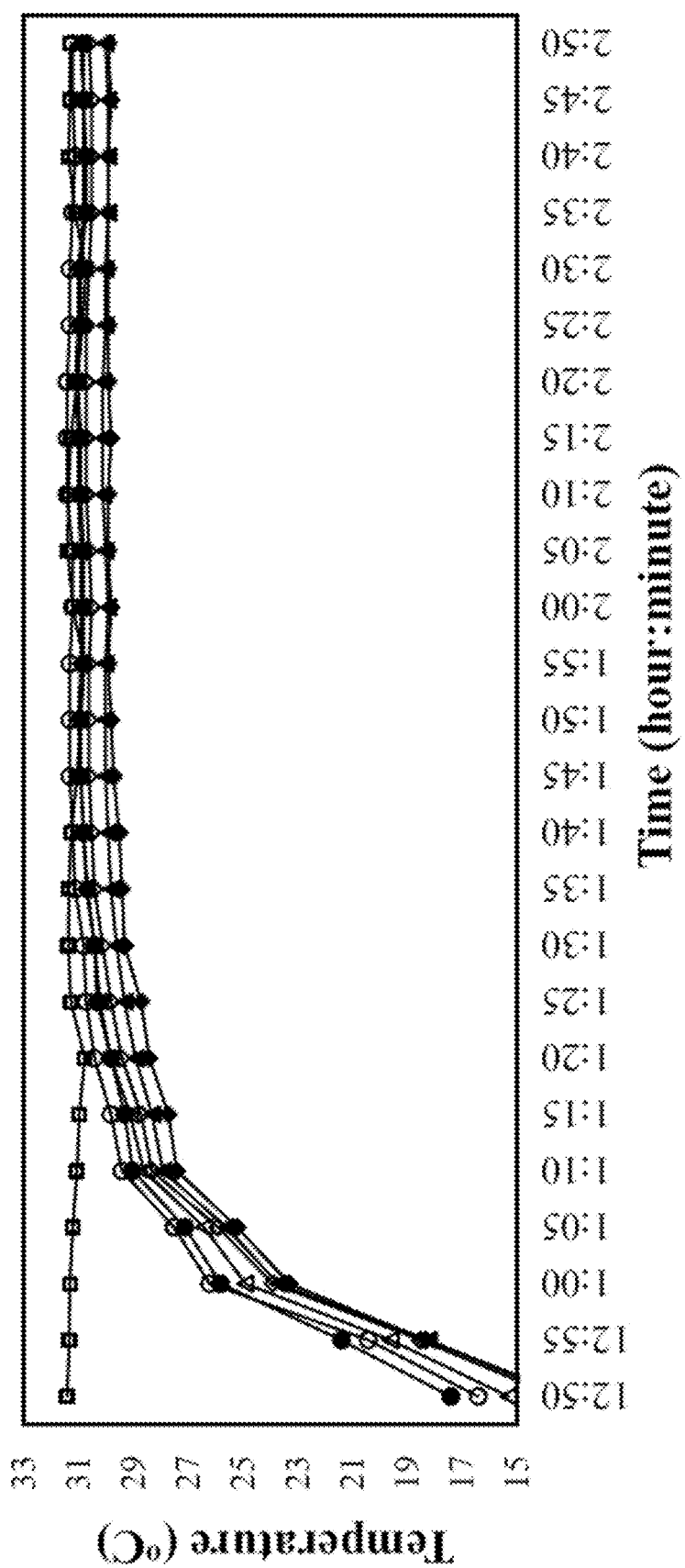
FIG. 5 show shows temperature equilibration for water (open squares) and example binders.

Eighteen samples of different binders (PG58-22, PG64-16, and PG76-22) were tested using this method. FIG. 5 shows temperature equilibration for water (open squares) and several of the samples.

Figure 6:
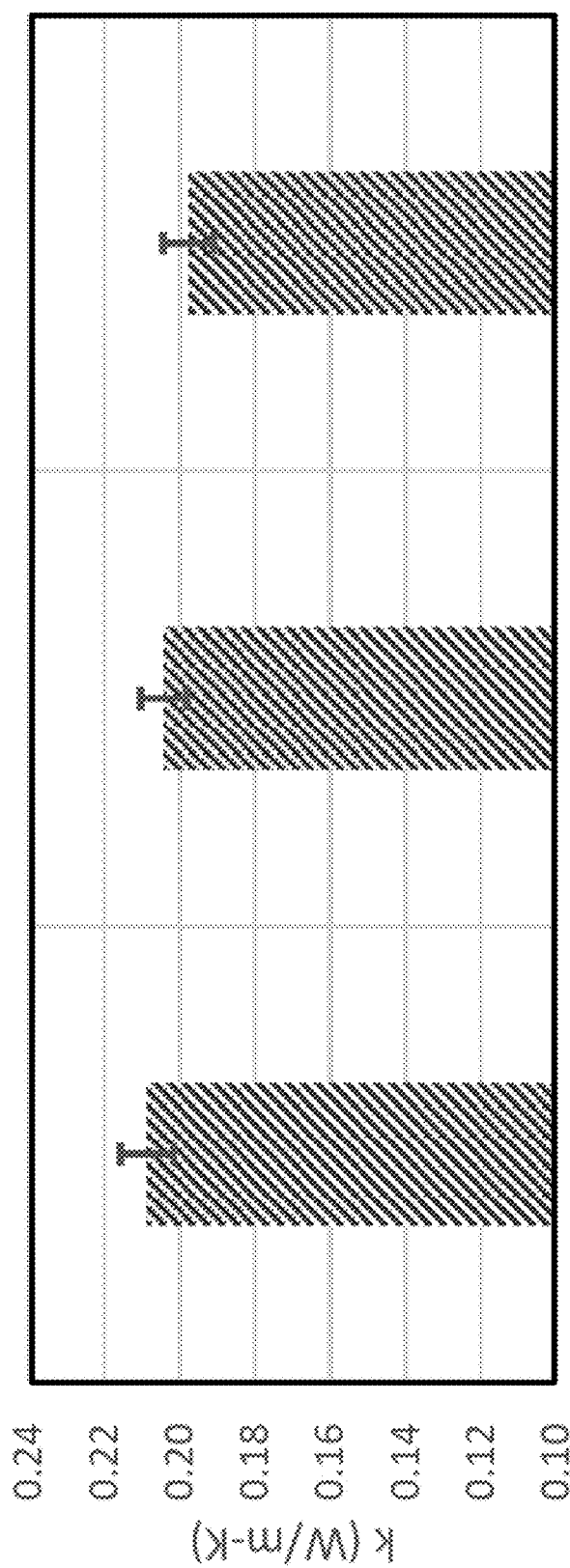
FIG. 6 shows average thermal conductivity for example binders.

Equation 4 was used to calculate the heat flow rate Q. Using this calculated value of Q, thermal conductivity k is calculated using Equation 3. That is, the calculation was made using Equation 3, but in this case solving for thermal conductivity (k). As mentioned previously, the whole system is employed inside a chamber setup at 25° C., and the resulting thermal conductivity is estimated under this condition. Test results are listed in Table 1. The average test results for each binder grade produced repeatable outcomes that are similar to known thermal conductivity values as shown in FIG. 6. The coefficient of variation was also under 10% for all the binder groups. While the average thermal conductivity between the binder grades are statistically the same, there seems to be a trend of having slightly lower thermal conductivity for stiffer binders. This result is consistent with the expectation that a PG76-22 binder with a polymer modification would have lower thermal conductivity compared with a conventional binder.

TABLE 1

Thermal conductivity of different binders

| Binder Type | Sample No. | h (m) | $r_2$ (m) | $r_1$ (m) | T1 (C.) | Q (W) Eq. 4 | T2 (C.) | $2\pi h\Delta T$ | ln (r2/r1) | k (W/m ° K) Eq. 3 | Average k (W/m ° K) | COV |
|---|---|---|---|---|---|---|---|---|---|---|---|---|
| Binder PG58-22 | 1 | 0.0250 | 0.020 | 0.001 | 31.37 | 0.01202 | 30.23 | 0.1787 | 2.996 | 0.201 | 0.210 | 0.08 |
| | 2 | 0.0250 | 0.020 | 0.001 | 31.15 | 0.01191 | 30.16 | 0.1559 | 2.996 | 0.229 | | |
| | 3 | 0.0250 | 0.020 | 0.001 | 31.15 | 0.01191 | 29.89 | 0.1983 | 2.996 | 0.180 | | |
| | 4 | 0.0250 | 0.020 | 0.001 | 31.20 | 0.01193 | 30.18 | 0.1602 | 2.996 | 0.223 | | |
| | 5 | 0.0250 | 0.020 | 0.001 | 31.00 | 0.01184 | 29.95 | 0.1649 | 2.996 | 0.215 | | |
| | 6 | 0.0250 | 0.020 | 0.001 | 31.40 | 0.01203 | 30.32 | 0.1696 | 2.996 | 0.212 | | |
| Binder PG64-16 | 7 | 0.0250 | 0.020 | 0.001 | 31.37 | 0.01202 | 30.16 | 0.1906 | 2.996 | 0.189 | 0.206 | 0.07 |
| | 8 | 0.0250 | 0.020 | 0.001 | 31.15 | 0.01191 | 30.1 | 0.1684 | 2.996 | 0.212 | | |
| | 9 | 0.0250 | 0.020 | 0.001 | 31.15 | 0.01191 | 29.9 | 0.1936 | 2.996 | 0.184 | | |
| | 10 | 0.0250 | 0.020 | 0.001 | 31.20 | 0.01193 | 30.15 | 0.1649 | 2.996 | 0.217 | | |
| | 11 | 0.0250 | 0.020 | 0.001 | 31.00 | 0.01184 | 29.98 | 0.1602 | 2.996 | 0.221 | | |
| | 12 | 0.0250 | 0.020 | 0.001 | 31.40 | 0.01203 | 30.31 | 0.1712 | 2.996 | 0.211 | | |
| Binder PG76-22 | 13 | 0.0250 | 0.020 | 0.001 | 31.37 | 0.01202 | 30.25 | 0.1758 | 2.996 | 0.205 | 0.199 | 0.08 |
| | 14 | 0.0250 | 0.020 | 0.001 | 31.15 | 0.01191 | 29.9 | 0.2006 | 2.996 | 0.178 | | |
| | 15 | 0.0250 | 0.020 | 0.001 | 31.15 | 0.01191 | 29.9 | 0.1998 | 2.996 | 0.179 | | |
| | 16 | 0.0250 | 0.020 | 0.001 | 31.20 | 0.01193 | 30.10 | 0.1728 | 2.996 | 0.207 | | |
| | 17 | 0.0250 | 0.020 | 0.001 | 31.00 | 0.01184 | 29.95 | 0.1649 | 2.996 | 0.215 | | |
| | 18 | 0.0250 | 0.020 | 0.001 | 31.40 | 0.01203 | 30.31 | 0.1712 | 2.996 | 0.211 | | |

Based on known thermal susceptibility of the asphalt binders, it is recommended to perform the test between 28° C. and 40° C. to avoid the softening of the samples. The temperature of the water would vary depending on the type of binder being evaluated. For softer binders such us PG58-22, and PG64-16, the recommended maximum test temperature is 28° C., which is about 15° C. below their softening point measured with the ring and ball method. For stiffer binders such as PG76-22, the recommended maximum test temperature is 33° C. Binders modified with polymers can be tested up to 40° C.

This method can be implemented using any type of water-bath following the calibration step described in this document. In one example, K type thermocouples with an automatic USB output thermometer was used. In another example, the temperature was manually registered over Thermal conductivity of asphalt binders is known to range between 0.17 W/m-K and 0.28 W/m-K. From Table 1, k is seen to vary between 0.23 W/m-K and 0.18 W/m-K (note that in the calculation, Celsius degrees are converted to Kelvin). This method to estimate thermal conductivity of bitumen samples presents an affordable alternative test procedure with good accuracy.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. For example, although experiments were described for asphalt binders, methods described herein are generally applicable to viscoelastic materials. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of assessing an average thermal conductivity of a viscoelastic material in a steady state using a conduction method, the method comprising:
   i) allowing a sample of the viscoelastic material to reach thermal equilibrium in a liquid at a first temperature;
   ii) assessing a heat flow of the sample at the first temperature;
   iii) repeating i) and ii) at one or more additional temperatures; and
   iv) assessing the average thermal conductivity of the viscoelastic material based on the heat flow of the sample at the first temperature and the one or more additional temperatures, a cross-sectional area of the sample, and a temperature-thickness gradient of the sample at thermal equilibrium at the first temperature and the one or more additional temperatures, respectively.

2. The method of claim 1, wherein the viscoelastic material comprises bitumen.

3. The method of claim 1, wherein the liquid comprises water.

4. The method of claim 1, further comprising molding the viscoelastic material to yield the sample.

5. The method of claim 1, wherein the first temperature and the one or more additional temperatures span a range between about 30° C. and about 80° C.

6. The method of claim 1, wherein the temperature-thickness gradient of the sample is equal to a difference between an equilibrium temperature at an interior of the sample and an equilibrium temperature at an exterior surface of the sample divided by a distance from the exterior surface of the sample to the interior of the sample.

7. The method of claim 6, wherein the sample is a cylinder.

8. The method of claim 7, wherein the cylinder defines an opening along a longitudinal axis of the cylinder.

9. The method of claim 8, wherein a surface of the opening defines the interior of the sample.

10. The method of claim 9, wherein the equilibrium temperature at the interior of the sample corresponds to a temperature at a surface of the opening.

* * * * *